United States Patent
Uchida (10) Patent No.: US 9,356,736 B2
(45) Date of Patent: May 31, 2016

(54) PORTABLE ELECTRONIC DEVICE AND IC CARD PROCESSING DEVICE

(71) Applicant: Kabushiki Kaisha Toshiba, Tokyo (JP)

(72) Inventor: Keisuke Uchida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 14/202,039

(22) Filed: Mar. 10, 2014

(65) Prior Publication Data

US 2015/0082111 A1    Mar. 19, 2015

(30) Foreign Application Priority Data

Sep. 18, 2013    (JP) .................................. 2013-193557

(51) Int. Cl.
| | |
|---|---|
| *H04L 1/18* | (2006.01) |
| *H04L 1/08* | (2006.01) |
| *G06F 11/10* | (2006.01) |
| *G06K 7/10* | (2006.01) |
| *G06K 19/07* | (2006.01) |
| *G07F 7/08* | (2006.01) |

(52) U.S. Cl.
CPC .............. *H04L 1/08* (2013.01); *G06F 11/1004* (2013.01); *G06K 7/10237* (2013.01); *G06K 19/0723* (2013.01); *G07F 7/0806* (2013.01); *G07F 7/0893* (2013.01)

(58) Field of Classification Search
None
See application file for complete search history.

(56) References Cited

U.S. PATENT DOCUMENTS

| | | | | |
|---|---|---|---|---|
| 5,953,368 A * | 9/1999 | Sanderford | ............ | G08B 25/10 375/141 |
| 2002/0051438 A1* | 5/2002 | Yano | ....................... | G08C 15/00 370/335 |
| 2002/0176362 A1* | 11/2002 | Yun | ....................... | H04L 1/0002 370/236 |
| 2007/0237087 A1 | 10/2007 | Shimizu | | |
| 2008/0052589 A1 | 2/2008 | Shinohara et al. | | |
| 2012/0112889 A1 | 5/2012 | Mo et al. | | |
| 2013/0073919 A1 | 3/2013 | Sano | | |

FOREIGN PATENT DOCUMENTS

| | | |
|---|---|---|
| EP | 2278769 A2 | 1/2011 |
| JP | H01-255990 A | 10/1989 |

(Continued)

OTHER PUBLICATIONS

Extended European Search Report issued in related European Patent Application No. 14158315.3 mailed Sep. 8, 2014, 8 pages.

(Continued)

*Primary Examiner* — Daniel McMahon
(74) *Attorney, Agent, or Firm* — Baker Botts L.L.P.

(57) ABSTRACT

An IC card includes a communication interface and a controller. The controller divides data to be transmitted to the external device into a plurality of divided portions of the data. Moreover, the controller transmits each of the divided portions of the data to which an error detection code is given, to the external device through the communication interface so as to make a predetermined non-transmission period after transmission of the each of the divided portions of the data. Moreover, the controller executes detecting an error notice showing a failure in receiving each of the divided portions of the data that is transmitted from the external device in the predetermined non-transmission period. Furthermore, when the error notice is detected, the controller retransmits the divided portion of the data which the controller has transmitted just before the controller detects the error notice.

7 Claims, 8 Drawing Sheets

(56) References Cited

FOREIGN PATENT DOCUMENTS

| | | |
|---|---|---|
| JP | 2011-150597 A | 8/2011 |
| KR | 10-2003-0045586 A | 6/2003 |
| KR | 10-1012151 B1 | 2/2011 |
| KR | 20110010543 A | 2/2011 |
| WO | 02/073522 A1 | 9/2002 |

OTHER PUBLICATIONS

"Cards and Personal Identification", ISO/IEC JTC1/SC17 N 3269 in "Notification of Ballot: ISO/IEC FCD 14443-4 (Revision) Identification cards—Contactless integrated circuit cards—Proximity cards—Part 4: Transmission Protocol", Oct. 14, 2007, 46 pages.

ISO/IEC JTC1/SC17 N 1689, "Notification of Ballot: ISO/IEC FCD 14443-4 Identification cards—Contactless integrated circuit cards—Proximity cards—Part 4: Transmission Protocol", Mar. 10, 2000, 39 pages.

Office Action issued in related Singapore Patent Application No. 10201400482W mailed Dec. 4, 2014, 12 pages.

IEEE Standards Association, Part 11: Wireless LAN Medium Access Control (MAC) and Physical Layer (PHY) Specifications 802.11-2012, Mar. 29, 2012, pp. 308 and 852.

Office Action issued in related Korean Patent Application No. 10-2014-26031 mailed Feb. 26, 2015, 7 pages (with translation).

Office Action issued in corresponding Korean patent application No. 10-2014-0026031, mailed Aug. 27, 2015 (8 pages with translation).

Office Action issued in corresponding Singapore patent application No. 10201400482W, mailed Jan. 19, 2016, (8 pages).

\* cited by examiner

PORTABLE ELECTRONIC DEVICE AND IC CARD PROCESSING DEVICE

CROSS-REFERENCE TO RELATED APPLICATION

This application is based upon and claims the benefit of priority from the prior Japanese Patent Application No. 2013-193557, filed on Sep. 18, 2013, the entire contents of which are incorporated herein by reference.

FIELD

An embodiment of this invention relates to a portable electronic device, and an IC card processing device.

BACKGROUND

In order to detect a communication error, a portable electronic device such as an IC card may use an error detection code (EDC) in data communications with an external device. Conventionally, an IC card gives the EDC to the whole message, and it repeats a retransmitting process until the external device of a transmission destination can confirm the justification of the message. However, when the message is large in data size, the IC card needs to retransmit the large data, and a communication time and the whole processing time may become long.

In a conventional technology, when a communication error arises when the message is large in data size, the IC card needs to retransmit the large data and thereby the communication time and the whole processing time become long.

DETAILED EMBODIMENT

According to an embodiment, the An portable electronic device includes a communication section and a control section. The communication section transmits and receives data with the external device in a noncontact manner. The control section divides data to transmit to the external device into divided data portions. The control section gives an error detection code to the divided data portion. Moreover, the control section transmits the divided data portion to which the error detection code is given to the external device through the communication section intermittently so as to make a predetermined non-transmission period. Moreover, the control section detects that an error notice showing a failure in receiving the divided data portion form the external device is transmitted in the non-transmission period. Furthermore, the control section retransmits the divided data portion to which the error detection code is given transmitted last when the error notice is detected.

Embodiment 1

Figure 1:
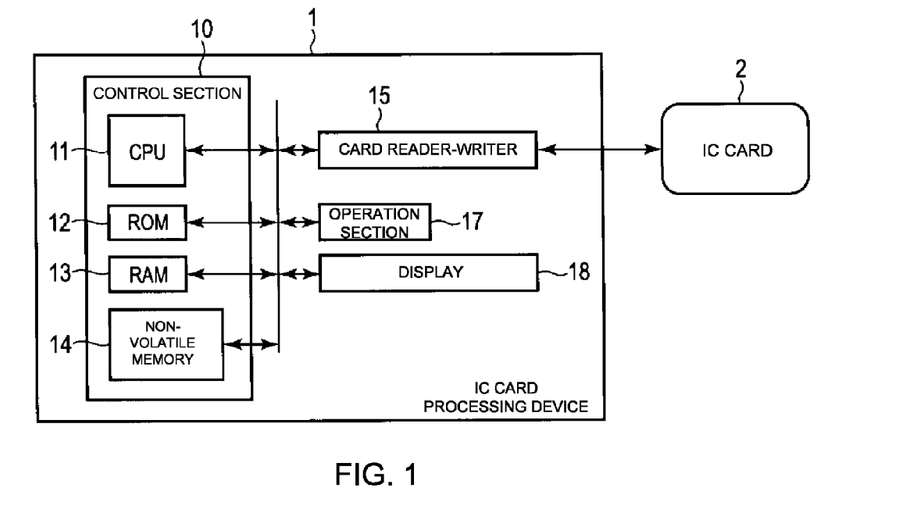
FIG. 1 illustrates a configuration example of an IC card system which has an IC card and an IC card processing device concerning an embodiment 1.

Hereinafter, embodiment 1 is explained with reference to the drawings. FIG. 1 is a block diagram for explaining a configuration example of an IC card system having an IC card 2 as a portable electronic device concerning the embodiment and an IC card processing device 1 as an external device that performs communication with the IC card 2.

The IC card 2 is the portable electronic device that processes a command given from the external device and outputs a processing result as a response. In the embodiment, the IC card 2 is a noncontact type IC card. The IC card 2 as a noncontact type IC card in the embodiment shall conform to ISO/IEC 14443-4 which is an international standard, for example.

First, a configuration of the IC card processing device 1 is explained. In a configuration example shown in FIG. 1, the IC card processing device 1 has a control section 10, a card reader-writer 15, an operation section 17, and a display 18. Moreover, the control section 10 has a CPU 11, an ROM 12, an RAM 13, and a nonvolatile memory 14. The control section 10 may be constituted by a personal computer (PC), for example. The CPU 11, the ROM 12, the RAM 13, the nonvolatile memory 14, the card reader-writer 15, the operation section 17, and the display 18 are mutually connected via a bus, respectively.

The CPU 11 manages control of the whole of the IC card processing device 1. The CPU 11 performs various kinds of processing by executing a control program stored in the ROM 12 or the nonvolatile memory 14. The CPU 11 performs transmission and reception of a command and a response with the IC card 2 via the card reader-writer 15, for example.

The ROM 12 is a nonvolatile memory which stored a control program, control data, etc. beforehand. The RAM 13 is a volatile memory that performs as a working memory. The RAM 13 stores data that the CPU 11 is processing, etc. temporarily. The RAM 13 stores temporarily data that is transmitted and received to and from the external device via the card reader-writer 15, for example. Moreover, the RAM 13 stores temporarily a program that the CPU 11 executes.

The nonvolatile memory 14 is configured by a rewritable nonvolatile memory, such as EEPROM etc., for example. The nonvolatile memory 14 stores a control program, control data, application, and data used for the application, for example.

The card reader-writer 15 is an interface device for performing communication with the IC card 2. The card reader-writer 15 is configured by an interface corresponding to a communication method of the IC card 2. When the IC card 2 is the noncontact type IC card, the card reader-writer 15 is configured by an antenna, a communication control section, etc. for performing wireless communications with the IC card 2.

The card reader-writer 15 corresponding to the noncontact type IC card supplies a carrier wave for electric power supply, data transmission and reception, etc. to the IC card 2. The card reader-writer 15 supplies the carrier wave modulated to a predetermined frequency to the IC card 2. The card reader-writer 15 can modulate the carrier wave based on the instructions from the control section 10.

The card reader-writer 15 corresponding to the noncontact type IC card performs a reset control to the IC card 2 and transmission and reception of data to and from the IC card 2. The card reader-writer 15 using performs activation (starting) of the IC card 2, transmission of various commands, reception of response to the command transmitted, etc. based on the control by the CPU 11 of the control section 10 by such functions.

Various operator instructions are inputted into the operation section 17 by an operator of the IC card processing device 1. The operation section 17 transmits data of the operator instructions inputted by the operator to the CPU 11. The operation section 17 is a keyboard, a numeric keypad, a touch panel, etc., for example. The display 18 is a device which displays various kinds of information by the control of the CPU 11. The display 18 is a liquid crystal display, for example.

Next, the IC card 2 is explained. The IC card 2 is activated by receiving supply of electric power etc. from a higher level device, such as the IC card processing device 1 (the IC card becomes in the state where it can operate). The IC card 2 receives an electric wave from the IC card processing device 1 via an antenna, a modulation and demodulation circuit, etc. used as a communication interface, generates an operation electric power and an operation clock from the electric wave by a power supply section which is not illustrated, and is activated.

Figure 2:
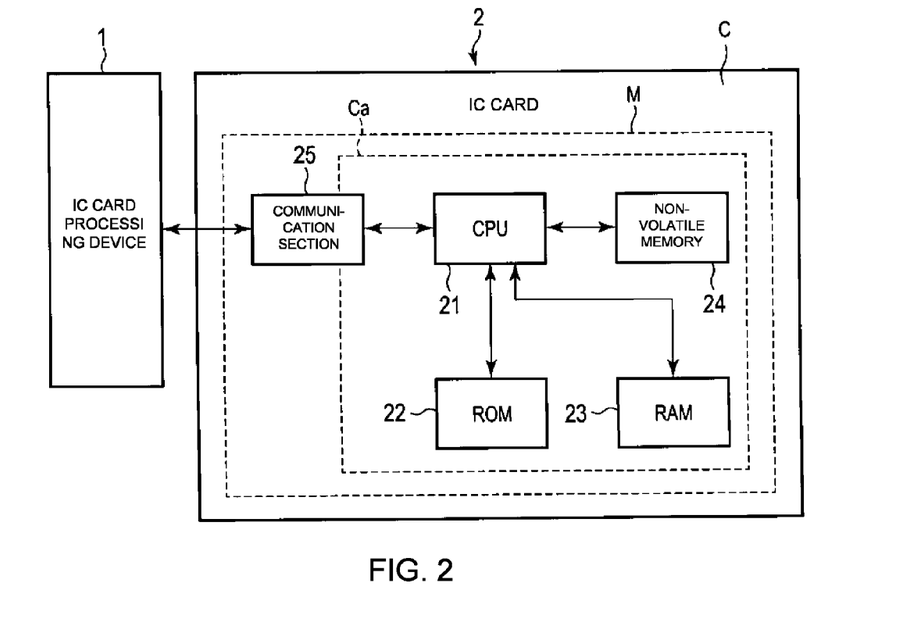
FIG. 2 is a block diagram illustrating a configuration example of the IC card concerning the embodiment 1.

Next, a configuration example of the IC card 2 is explained. The FIG. 2 is a block diagram schematically showing a configuration example of the IC card 2 concerning the embodiment. The IC card 2 has a main body C of a card shape formed by plastic material etc. A module M is built in the main body C. The module M is formed in one, where one or more IC chips Ca and the external interface (communication interface) as the communication section are connected, and the module M is buried in the main body C of the IC card 2.

In the configuration example shown in FIG. 2, the IC card 2 includes a CPU 21, an ROM 22, an RAM 23, a nonvolatile memory 24 and a communication section 25. These sections are connected each other via a data bus. Moreover, the CPU 21, the ROM 22, the RAM 23, and the nonvolatile memory 24 are configured by one or more IC chips Ca, and the IC chip Ca and the communication section 25 constitute the module M where they are connected.

The CPU 21 performs as a control section that manages control of the whole of the IC card 2. The CPU 21 performs various kinds of processing based on a control program and control data stored in the ROM 22 or the nonvolatile memory 24. The CPU 21 performs various kinds of processing according to an operation control of the IC card 2, or an operation form of the IC card 2 by executing the program stored in the ROM 22, for example. In addition, a part of various functions may be realized by a hardware circuit. In this case, the CPU 21 controls a function performed by the hardware circuit.

The ROM 22 is a nonvolatile memory. A control program, control data, etc. conforming to a specification of the IC card 2 are built into the ROM 22 in a manufacturing stage.

The RAM 23 is a volatile memory. The RAM 23 stores temporarily data which the CPU 21 is processing. The RAM 23 performs as a buffer for calculation, a buffer for reception and a buffer for transmission, for example. As the buffer for calculation, the RAM 23 holds temporarily a result of various kinds of operation processing etc. which the CPU 21 performs. As the buffer for reception, the RAM 23 holds command data etc. which was received from the IC card processing device 1 via the communication section 25. As the buffer for transmission, the RAM 23 holds a message (response data) etc. which is transmitted to the IC card processing device 1 via the communication section 25. Moreover, the RAM 23 stores a flag which shows an operating state.

The nonvolatile memory 24 is configured by a rewritable nonvolatile memory, such as EEPROM, FLASH ROM etc., for example. The nonvolatile memory 24 stores the control program, the application, and the various data according to the operational use of the IC card 2. A program file, a data file, etc. are created in the nonvolatile memory 24, for example. The control program, the various data, etc. are written in each created file.

The communication section 25 is an interface for performing communication with the card reader-writer 15 of the IC card processing device 1. In the IC card 2 as the noncontact type IC card, the communication section 25 performs wireless communications with the card reader-writer 15 of the IC card processing device 1, and the communication section 25 is configured by a communication control section, such as a modulation and demodulation circuit, and an antenna.

The communication section 25 transmits a second carrier wave to the IC card processing device 1. The communication section 25 performs a predetermined modulation to the carrier wave received from the IC card processing device 1, and reflects it to the IC card processing device 1 as the 2nd carrier wave (a subcarrier, for example), for example. Moreover, the communication section 25 can modulate the second carrier wave based on an instruction from the CPU 21.

Next, a communication method between the IC card 2 and the IC card processing device 1 is explained. The IC card 2 and the IC card processing device 1 transmit and receive data of a predetermined format. The IC card processing device 1 transmits command data of the predetermined format to the IC card 2, and the IC card 2 replies response data of the predetermined format to the IC card processing device 1. The IC card 2 and the IC card processing device 1 perform data communications with the data transmission method specified by ISO/IEC 14443-4, for example.

However, the communication method between the IC card 2 as the portable electronic device, and the IC card processing devices 1 as the external device is not limited to the data transmission method specified by ISO/IEC 14443-4, but a data transmission method which can transmits and receives data of predetermined format and can perform error checking to transmission and reception data.

Figure 3:
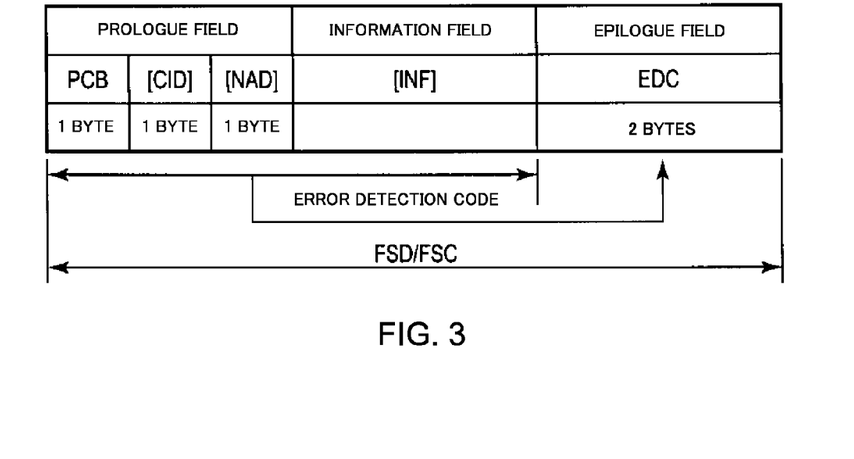
FIG. 3 illustrates a configuration example of a format of a data block which the IC card and the IC card processing device concerning the embodiment 1 transmit and receive.

FIG. 3 shows a configuration example of a format of a data block that the IC card 2 and the IC card processing device 1 transmit and receive. FIG. 3 shows a configuration example of the data block transmitted and received by the data transmission method specified by ISO/IEC 14443-4. In the data transmission method specified by ISO/IEC 14443-4, as a block transmission, data is transmitted and received in three kinds of formats, I-block (Information block), R-block (Receive ready block) and S-block (Supervisory block).

The I-block, the R-block and the S-block have roles different, respectively. The I-block (I block) is a format for transmitting information used by an application layer. The I-block is used for usual data reading-out and writing.

The R-block (R block) is a format for transmitting an acknowledgement or a negative acknowledgement. There are kinds of R-block, such as an R-block (ACK), an R-block (NAK) etc. The R-block (ACK) is used when a next command is requested. Moreover, the R-block (NAK) is used when retransmission of a received command is requested.

The S-block (S block) is a format for exchanging control information between the IC card 20 and the IC card 30. The S-block is used as an extension request of processing time (WTX: Waiting Time extension) and a command that deactivates the IC card (Deselect), for example. In addition, in the S-block, PCB specifies the extension demand of processing time (WTX) or the command to deactivate (Deselect).

As shown in FIG. 3, a frame conforming to the block format specified by ISO/IEC14443 includes fields, such as a prologue field, an information field, and an epilogue field. All the I-block, the R-block and the S-block conform to the block format shown in FIG. 3.

The prologue field has data of Protocol Control Byte (PCB), Card IDentifier (CID), Node Address (NAD), etc.

The PCB is a protocol control byte. The PCB can transmit information required for control of data transmission to a device (external device) of the other party. The PCB has information that shows whether this frame is the I-block, the R-block or the S-block, for example.

The CID is a card identifier. The CID is data for specifying the IC card that is a processing object. The IC card 2 has stored a peculiar card identifier in the RAM 23 or the non-volatile memory 24. The NAD is a node address. The NAD is data for building a different logic connection.

The information field (INF) stores a data body of a command, application data, or state information, for example. The IC card 2 performs various kinds of processing according to the data stored in the information field. In addition, the information field may be omitted. As for the R-block, the information field is omitted.

The epilogue field stores an error detection code (EDC), such as CRC (Cyclic Redundancy Check), for example, in order to detect a data abnormality by a communication error etc. The error detection code is a value calculated based on the data of the prologue field and the information field. A device of a receiving side can detect data abnormalities, such as a communication error, based on the data in the prologue field and the information field and the error detecting code of the received data. The IC card processing device 1 which received the I-block from the IC card 2 checks existence of an error by the EDC data in the epilogue field of the I-block which is received, for example.

Figure 4:
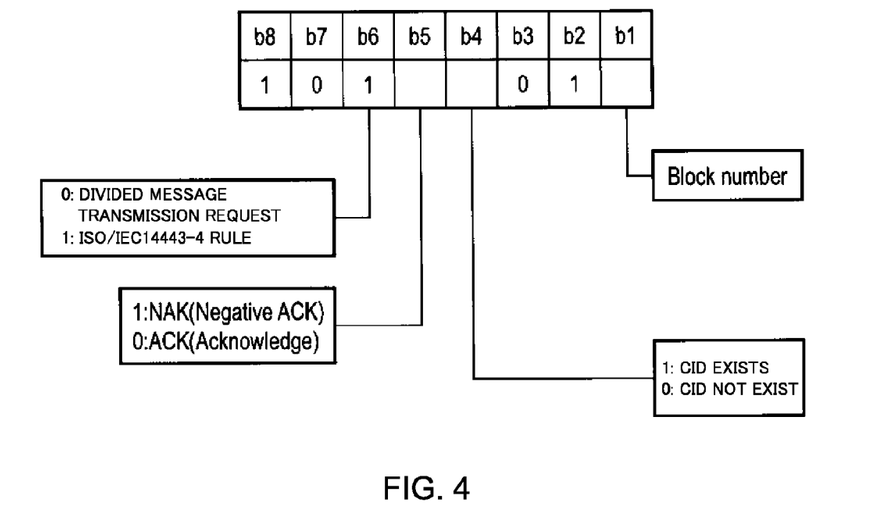
FIG. 4 illustrates an example of a format of PCB of R-block which the IC card and the IC card processing device concerning the first embodiment transmit and receive.

FIG. 4 shows an example of the format of the PCB of the R-block. A frame of the R-block is provided with the prologue field and the epilogue field. The PCB of the R-block is a one-byte data and includes a first bit b1 to an eighth bit b8.

In a PCB of the I-block, a first bit b1 is a block number (Block number). A second bit b2 is "1" as a default value. A third bit b3 is "0" as a default value. A fourth bit b4 shows an existence of the CID. As for the fourth bit 4, "1" shows the existence of the CID, and "0" shows non-existence of the CID.

A fifth bit b5 shows a result of an EDC inspection. As for the fifth bit b5, "1" shows an NAK (Negative acknowledge), and "0" shows an ACK (Acknowledge).

A sixth bit b6 shows whether dividing message and retransmitting divided messages are requested or not. Hereinafter, dividing message and retransmitting the divided messages is called a "divided-message retransmission". Moreover, a request that requests to divide message and to retransmit the divided messages is called as a "divided-message retransmission request". As for the sixth bit 6b, "0" shows a divided-message retransmission request, and "1" shows a normal-message transmission request (it is the block defined by ISO/IEC 14443).

A seventh bit b7 and an eighth bit b8 show that a frame containing the PCB is the I-block, the R-block, or the S-block. In the case that the eighth bit b8 is "1" and the seventh bit b7 is "0", the seventh bit b7 and the eighth bit b8 show that a frame containing this PCB is the R-block, for example.

Figure 5:
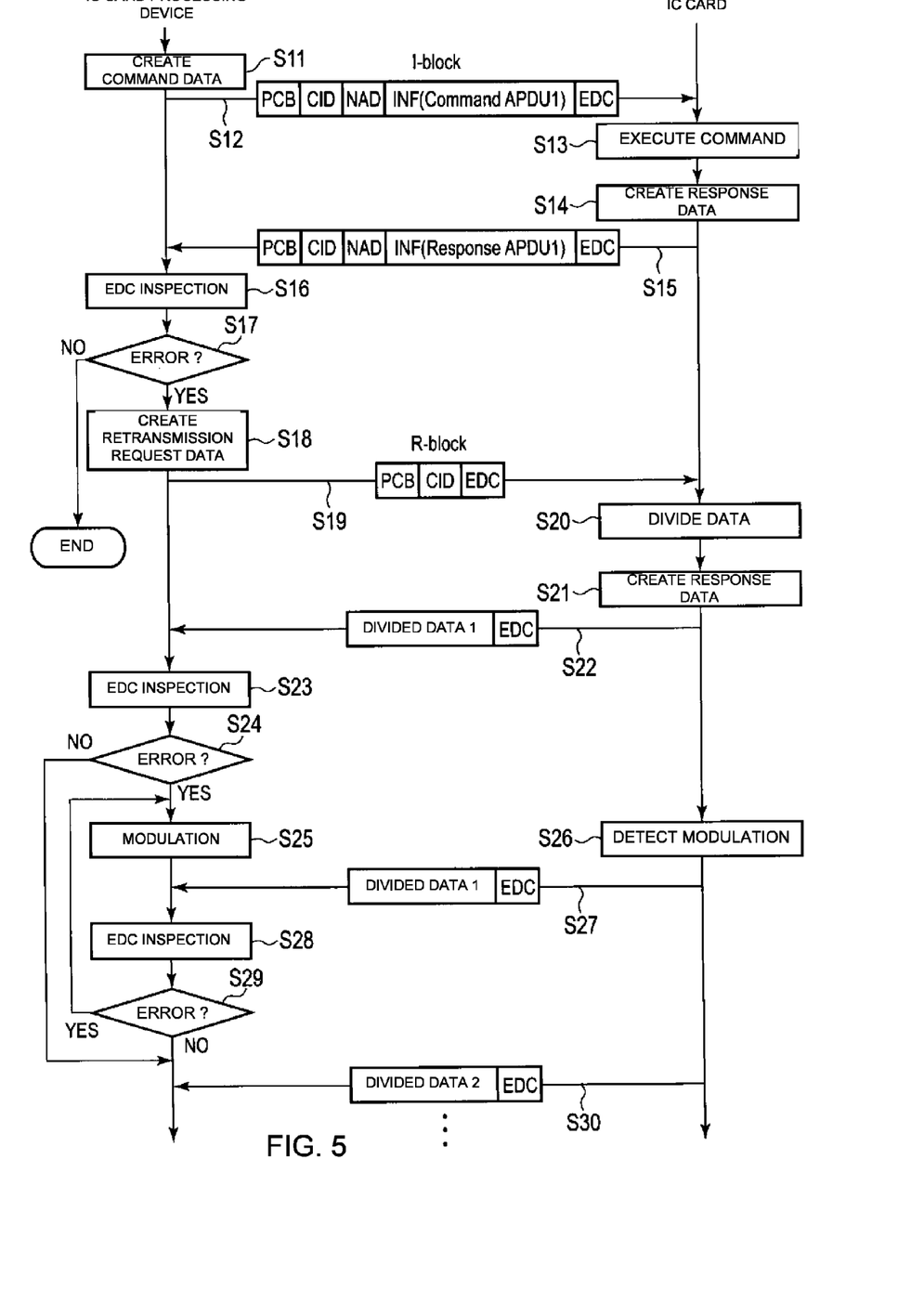
FIG. 5 shows an example of a communication sequence containing a communication error between the IC card and the IC card processing device concerning the embodiment 1.

Next, an exchange procedure of a command and a response in the IC card 2 and the IC card processing device 1 is explained. FIG. 5 shows an example of a communication sequence containing a communication error between the IC card 2 and the IC card processing device 1 concerning the embodiment. The IC card processing device 1 and the IC card 2 should be activated in a state that they can transmit and receive data mutually. That is, the card reader-writer 15 of the IC card processing device 1 transmits the carrier wave etc. to the IC card 2, and the IC card 2 is started by the carrier wave received, and thereby it is in a state that a communication protocol initial setting by communication protocol activation has been performed between the IC card processing device 1 and the IC card 2.

First, the control section 10 of the IC card processing device 1 creates a command data which request processing to the IC card 2 in the format of the I-block (Information block) (Step S11). Upon creating the command, the control section 10 of the IC card processing device 1 transmits the created command data of the I-block by the card reader-writer 15 (Step S12).

The CPU 21 of the IC card 2 receives the command of the I-block from the IC card processing device 1 by the communication section 25. The CPU 21 of the IC card 2 analyzes the received data (command) of the I-block, and interprets contents of the command. Upon interpreting the content of the command, the IC card 2 performs processing which the command requests (Step S13). Upon executing the command, the CPU 21 of the IC card 2 creates response data (message) including information that shows an executing result of the command in the format of the I-block (Step S14). The CPU 21 of the IC card 2 transmits the message created in the format of the I-block (Step S15).

Here, the CPU 21 of the IC card 2 holds the response data in the buffer memory etc. of the RAM 23 until the IC card processing device 1 receives the transmitted response data normally. Moreover, here, the IC card 2 shall transmit (response) data with large data size (256 kB or more, for example) by the response data (message) of the I-block collectively. Although the message is a picture of a face of an owner of the IC card 2 etc., for example, the message is not limited to specific data.

The control section 10 of the IC card processing device 1 receives the message of the I-block from the IC card 2 by the card reader-writer 15. Upon receiving the message of the I-block from the IC card 2, the control section 10 of the IC card processing device 1 performs an EDC inspection about the received message of the I-block (Step S16). When an error is not detected by the EDC inspection (Step S17, NO), the control section 10 of the IC card processing device 1 analyzes the response data (data stored in the INF) from the IC card 2 to the command created at Step S11, and shifts to the next procedure.

When a communication error is detected by the EDC inspection (Step S17, YES), the control section 10 of the IC card processing device 1 creates the R-block (Receive ready block) which requests divided-message retransmission as a command which requests retransmission of the data which was failed (Step S18). That is, as for the R-block, "0" is stored as a value of "b6." The control section 10 of the IC card processing device 1 transmits the created R-block to the IC card 2 by the card reader-writer 15 (Step S19).

The CPU 21 of the IC card 2 receives the I-block from the IC card processing device 1 by the communication section 25. Upon receiving the R-block, the CPU 21 of the IC card 2 divides into plural data portions the data in the information field (INF) of the response data which is transmitted last (Step S20). Here, the CPU 21 of the IC card 2 divides into plural data portions the data in the information field (INF) of the response data transmitted at Step S15. A data size of each divided data portion is 256 bytes, for example, however, it is not limited to a specific data size. Moreover, divided data portion may be different in data size, respectively. Furthermore, the number into which the CPU 21 divides the data is not limited to the specific number. The data size of divided data portion and the number of divided data portion are determined, for example, at the time of the communication protocol activation, or before the transmission and reception of the data with large data size after the communication protocol activation.

Upon dividing into a plurality of portions the data in the information field, the CPU 21 gives an error detection code (EDC) to the divided data portion. Upon giving the error detection code to the divided data portion, the CPU 21 creates a response data containing the divided data portion to which the error detecting code was give in a predetermined format (for example, I-block) (Step S21). The error detection code given is the parity or the CRC, for example, however, it is not limited to specific contents.

Upon creating the response data, the CPU 21 transmits the response data containing top divided data portion (divided data 1) to the IC card processing device 1 by the communication section 25 (Step S22).

The control section 10 of the IC card processing device 1 receives the response data by the card reader-writer 15. Upon receiving the response data from the IC card 2, the control section 10 of the IC card processing device 1 performs the EDC inspection about the received response data (Step S32).

When a communication error is detected by the EDC inspection (Step S24, YES), the control section 10 modulates the carrier wave which is transmitted to the IC card 2 by the card reader-writer 15 as an error notice which shows that the IC card processing device 1 failed in receiving the divided data portion (Step S25). The control section 10 performs an amplitude modulation, a frequency modulation or a phase modulation to the carrier wave, for example. When the amplitude modulation is performed, the control section 10 makes the amplitude of the carrier wave small or large. The control section 10 returns the amplitude of the carrier wave to the original amplitude when a predetermined time passes. Moreover, when the frequency modulation is performed, the control section 10 raises or lowers the frequency of the carrier wave. The control section 10 returns the frequency of the carrier wave to the original frequency when a predetermined time passes. Moreover, when the phase modulation is performed, the control section 10 shifts a phase of the carrier wave by a predetermined angle (90 degrees, for example). The control section 10 may return the phase of the carrier wave when a predetermined time passes, or may not return it. In addition, the control section 10 may perform a modulation in which the amplitude modulation, the frequency modulation or the phase modulation are combined to the carrier wave. The modulation that the control section 10 performs is not limited to specific configuration.

When the control section 10 modulates the carrier wave, the CPU 21 of the IC card 2 detects that the carrier wave is modulated by the communication section 25 (Step S26). Upon detecting that the carrier wave is modulated, the CPU 21 transmits again the last transmitted response data to the IC card processing device 1 by the communication section 25 (Step S27). Here, the CPU 21 transmits the response data that contains the divided data 1 to the IC card processing device 1 by the communication section 25.

The control section 10 of the IC card processing device 1 receives the response data by the card reader-writer 15. Upon receiving the response data, the control section 10 of the IC card processing device 1 performs an EDC inspection about the received response data (Step S28).

When a communication error is detected by the EDC inspection (Step S29, YES), the control section 10 returns to Step S25. When the error is not detected by the EDC inspection (Step S24, NO), or when the error is not detected by the EDC inspection (Step S29, NO), the control section 10 stands by until the response data containing next divided data portion is transmitted. Here, since the divided data 2 is the next data of divided data 1, the control section 10 stands by until the response data containing the divided data 2 is transmitted.

After a predetermined time (non-transmitting period of time) passes after the CPU 21 of the IC card 2 transmitted the response data containing the divided data 1 in Step S22 or Step S27, the CPU 21 of the IC card 2 transmits the response data containing the divided data 2 to the IC card processing device 1 by the communication section 25 (Step S30). Here, after at least a period of time when the carrier wave can be modulated passes from the time when the control section 10 of the IC card processing device 1 conducts the EDC inspection and detects the communication error, the CPU 21 transmits next response data.

Since operation after the control section 10 of the IC card processing device 1 receives the response data containing the divided data 2 is the same as operation after receiving the response data containing the divided data 1, explanation thereof is omitted.

Finishing transmitting all the response data, the CPU 21 of the IC card 2 stands by. Upon receiving an EOF (End of Frame) which shows an end of the response data from the IC card 2, the control section 10 of the IC card processing device 1 judges that all the response data was received, and ends the communication with the IC card 2. Or, the control section 10 may creates new command data, and may transmit the created command data to the IC card 2.

Figure 6:
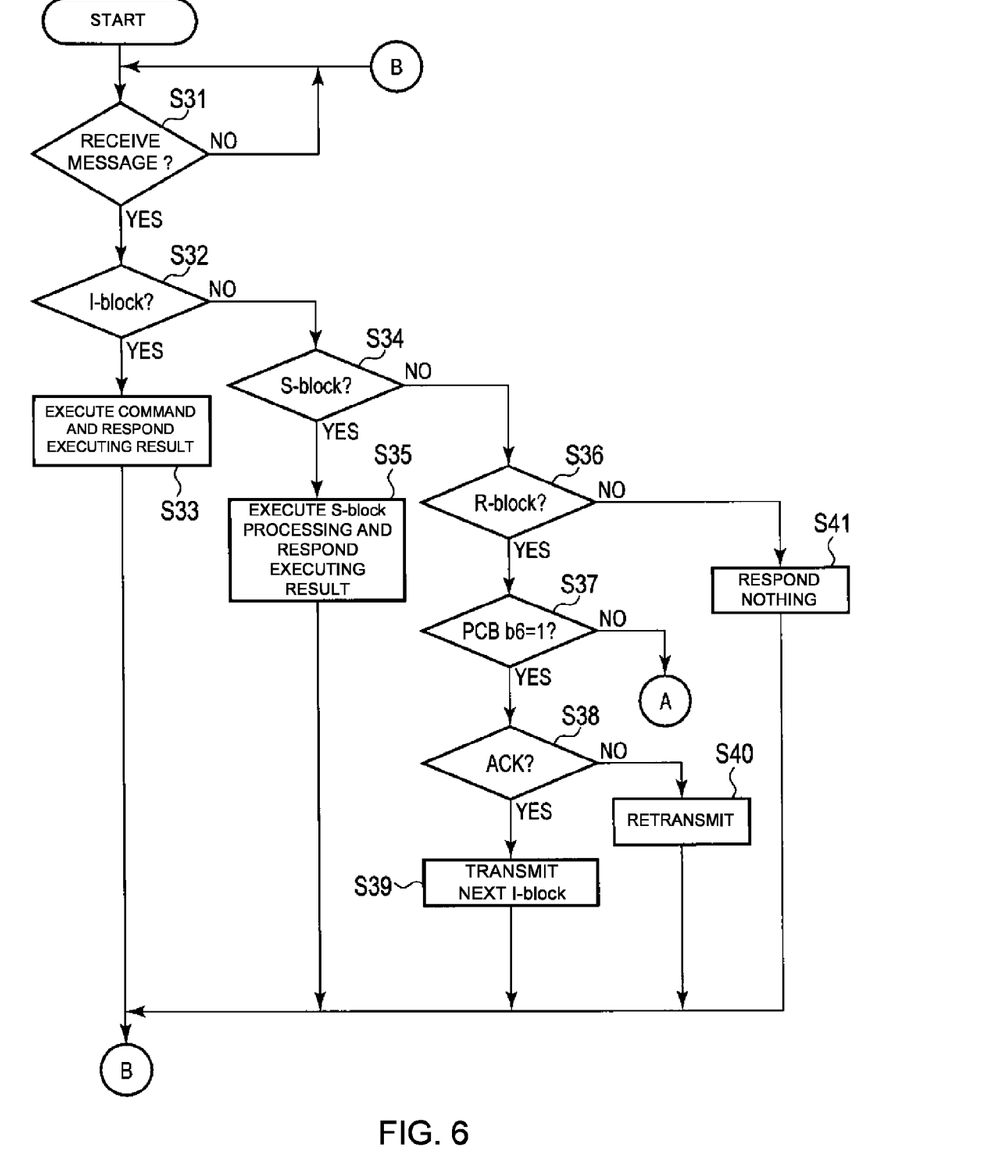
FIG. 6 is a flow chart for explaining an operation example of the IC card concerning the embodiment 1.
Figure 7:
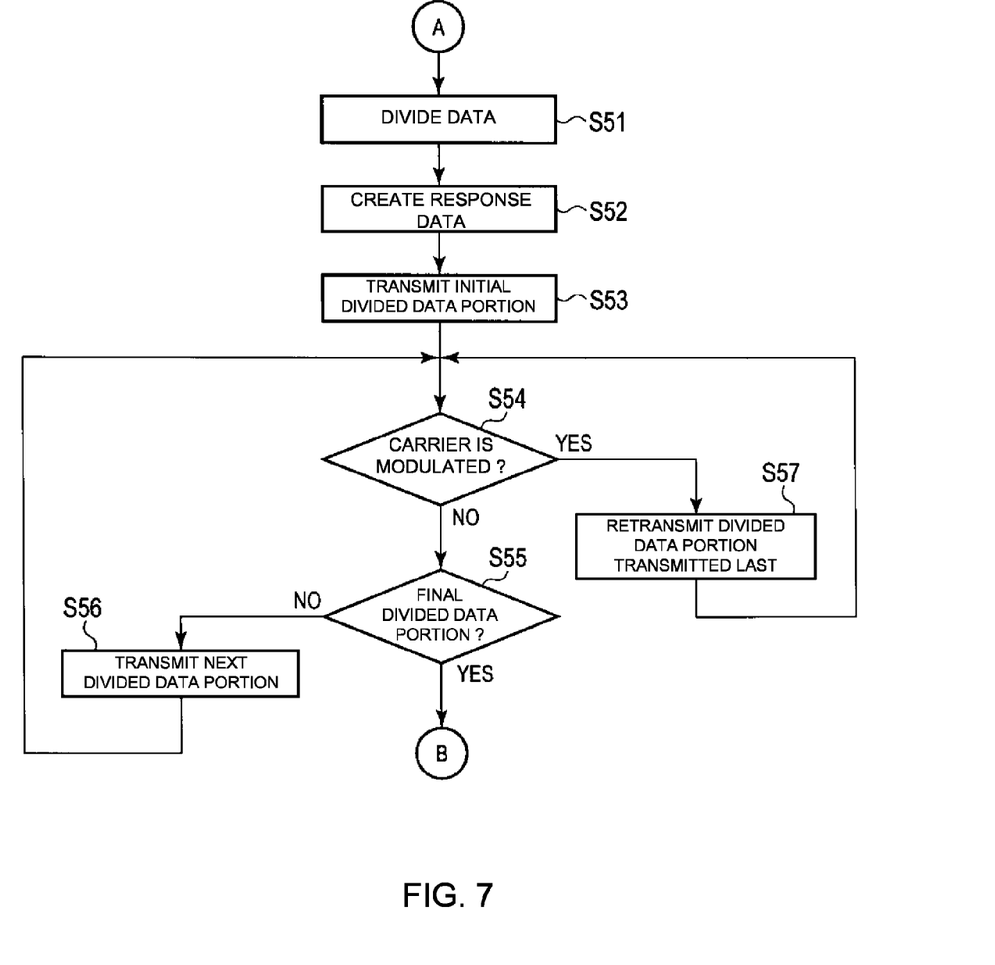
FIG. 7 is a flow chart for explaining an operation example of the IC card concerning the embodiment 1.

Next, an operation example of the IC card 2 that performs communication with the above IC card processing devices 1 is explained. FIGS. 6 and 7 are flow charts for explaining the operation example of the IC card 2. The CPU 21 of the IC card 2 which started by receiving the carrier wave etc. from the IC card processing device 1 will be in a state which it can receive a command (message) after activation of a communication protocol is completed by communication with the IC card processing device 1. In this state, the CPU 21 of the IC card 2 receives the message from the IC card processing device 1 by the communication section 25.

The CPU 21 of the IC card 2 judges whether the message was received from the IC card processing device 1 by the communication section 25 (Step S31). Upon judging that the message is not received (Step S31, NO), the CPU 21 returns to Step S31.

Upon judging that the message is received (Step S31, YES), the CPU 21 judged whether the received message is I-block (Step S32). Upon judging that the received message is the I-block (Step S32, YES), the CPU 21 executes the command stored in the INF section of the I-block, and replies an executing result to the IC card processing device 1 (Step S33).

When the CPU 21 judges that the received message is not the I-block (Step S32, NO), the CPU 21 judged whether the received message is the S-block (Step S34). Upon judging that the received message is the S-block (Step S34, YES), the CPU performs processing based on the received S-block, and replies an executing result to the IC card processing device 1 (Step S35).

Upon judging that the received message is not the S-block (Step S34, NO), the CPU 21 judges whether the received message is the R-block (Step S36). When the CPU 21 judges that the received message is the R-block (Step S36, YES), the CPU 21 judges whether b6 of the PCB of the received message is "1" (Step S37). That is, the CPU 21 judges whether the received message requests a divided-message transmission.

Upon judging that b6 of the PCB of the received message is "1" (Step S37, YES), the CPU 21 judges whether the received message shows ACK (Step S38). That is, the CPU 21 judges whether b5 of the PCB is "0."

Upon judging that the received message shows ACK (Step S38, YES), the CPU 21 transmits a next I-block to the IC card processing device 1 (Step S39). In addition, when there is no next I-block, the CPU 21 may skip Step S39.

Upon judging that the received message does not show ACK (that is, NAK is shown.) (Step S38, NO), the CPU 21 retransmits the last transmitted message to the IC card processing device 1 in a state as it is as NAK processing (Step S40). When the CPU 21 judges that the received message is not the R-block (Step S36, NO), the CPU 21 does not perform any response to the IC card processing device 1 (Step S41).

When the CPU 21 executed the command stored in the INF section of the I-block and replied an executing result to the IC card processing device 1 (Step S33), when the CPU 21 performed processing based on the received S-block and replied an executing result to the IC card processing device 1 (Step S35), when the CPU 21 transmitted next I-block to the IC card processing device 1 (Step S39), when the CPU 21 retransmits the last transmitted message to the IC card processing device 1 in the state as it is as NAK processing (Step S40), or when the CPU 21 did not reply any response to the IC card processing device 1 (Step S41), the CPU 21 returns to Step S31.

Upon judging that b6 of the PCB of the received message is not "1" (that is, it is "0".) (Step S37, NO), the CPU 21 divides into a plurality of portions the data stored in the INF section of the last transmitted response data (Step S51). Upon dividing the data into the plurality of portions, the CPU 21 gives the error detection code to the divided data portion and creates the response data which stores the divided data portion to which the error detecting code is given (Step S52).

Upon creating the response data, the CPU 21 transmits the response data containing the initial divided data portion to the IC card processing device 1 (Step S53). Upon transmitting the response data containing the initial divided data portion to the IC card processing device 1, the CPU 21 judges whether the carrier wave transmitted from the IC card processing device 1 was modulated in a predetermined period (a non-transmitting period, i.e., a non-modulation period) after response data was transmitted (Step S54).

Upon judging that the carrier wave is not modulated (Step S54, NO), the CPU 21 judges whether the response data transmitted last is a response data containing the final divided data portion (Step S55). Upon judging that the response data transmitted last is not the response data containing the final divided data portion (Step S55, NO), the CPU 21 transmits a response data containing next divided data portion to the IC card processing device 1 (Step S56).

Upon judging that the carrier wave has been modulated (Step S54, YES), the CPU 21 retransmits the response data transmitted last to the IC card processing device 1 (Step S57).

When the CPU 21 transmits the response data containing the next divided data portion to the IC card processing device 1 (Step S56), or when the CPU 21 retransmits the response data transmitted last to the IC card processing device 1 (Step S57), the CPU 21 returns to Step S54.

Upon judging that the response data transmitted last is the response data containing the final divided data portion (Step S55, YES), the CPU 21 returns to Step S31.

In the IC card and the IC card processing device which are configured as mentioned above, even when a communication error arises when the IC card transmits the data with large data size to the IC card processing device, the IC card does not need to retransmit all the data and should retransmit only the data which the error arose. Therefore, the IC card can transmit the data with large data size to the IC card processing device efficiently.

Embodiment 2

Next, the embodiment 2 is explained. The IC card system of the embodiment 2 differs from the IC card system of the embodiment 1 in that the IC card processing device 1 divides the data and transmits to the IC card 2. Therefore, detailed explanation about other points is omitted. Since the configuration of the IC card processing device 1 and the IC card 2 is the same as the configuration of the IC card processing device 1 and the IC card 2 concerning the embodiment 1, an explanation thereof is omitted.

Figure 8:
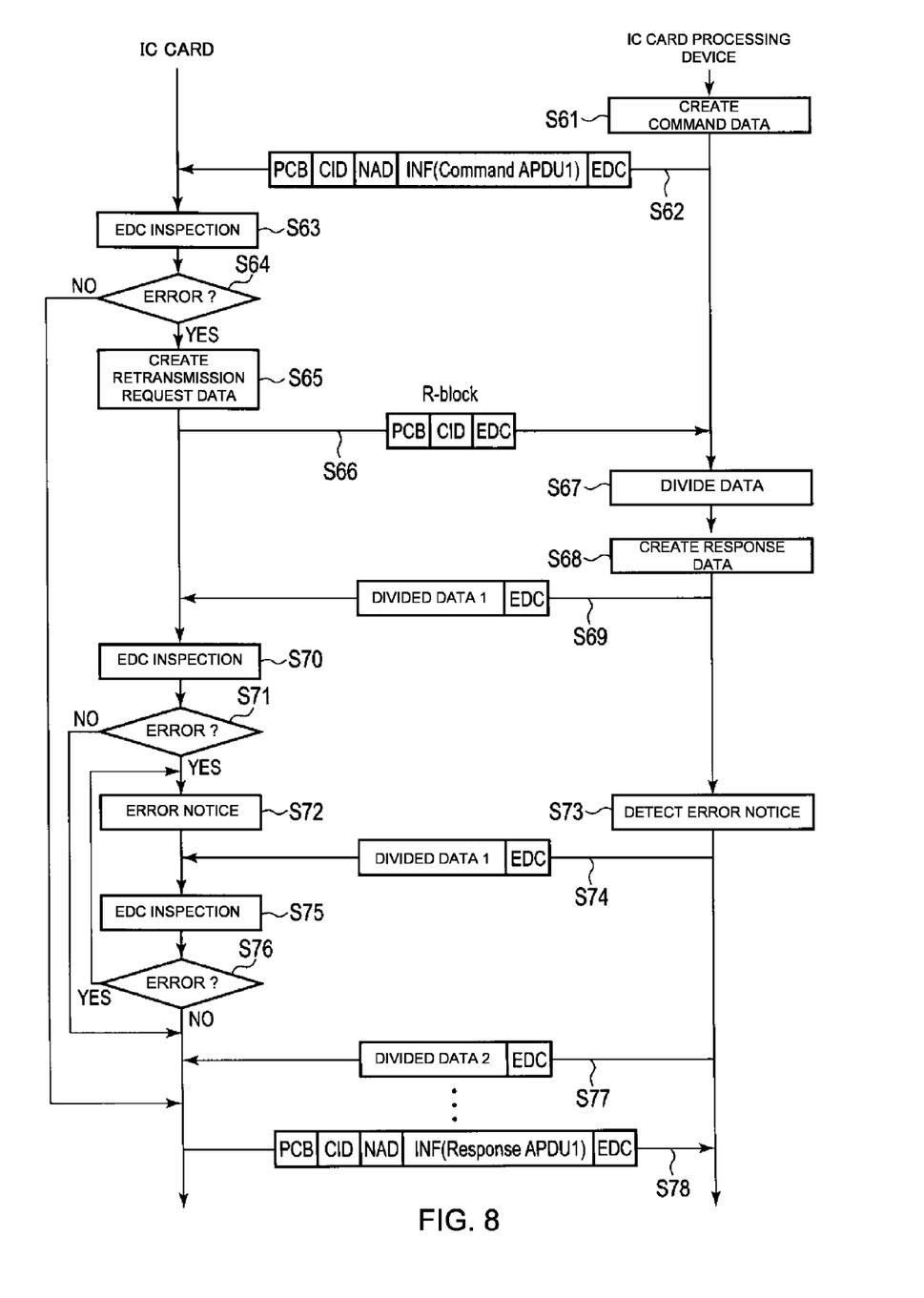
FIG. 8 shows an example of a communication sequence containing a communication error between the IC card and the IC card processing device concerning an embodiment 2.

Next, an exchange procedure of a command and a response by the IC card 2 and the IC card processing device 1 is explained. FIG. 8 shows an example of a communication sequence containing a communication error between the IC card 2 and the IC card processing device 1 concerning the embodiment 2. The IC card processing device 1 and the IC card 2 shall be activated in a state that they can transmit and receive data mutually. That is, the card reader-writer 15 of the IC card processing device 1 shall transmit the carrier wave etc. to the IC card 2, and the IC card 2 shall be activated by the received carrier wave. The IC card 2 transmits a second carrier wave to the IC card processing device 1. Moreover, a setup of a communication protocol etc. may be performed between the IC card processing device 1 and the IC card 2.

First, the control section 10 of the IC card processing device 1 creates a command data that requests processing to the IC card 2 in the format of the I-block (Information block) (Step S61). Upon creating the command, the control section 10 of the IC card processing device 1 transmits the created command data of the I-block by the card reader-writer 15 (Step S62).

Here, the control section 10 saves the command data transmitted in the RAM 13 etc. until the command data transmitted is normally received by the IC card 2. Moreover, the control section 10 shall transmit data with large data size (256 kB or more, for example) by the command data (message) of the I-block collectively. Although the message is a picture data of a face of an owner of the IC card 2 etc., for example, it is not limited to specific data.

The CPU 21 of the IC card 2 receives the command of the I-block from the IC card processing device 1 by the communication section 25. Upon receiving the message of the I-block from the IC card processing device 1, the CPU 21 of the IC card processing device 2 performs an EDC inspection about the received message of the I-block (Step S63).

When the CPU 21 of the IC card 21 detects an communication error by the EDC inspection (Step S64, YES), the CPU 21 of the IC card 2 creates the R-block (Receive ready block) that requests a divided-message retransmission as a command that requires retransmission of the data which was failed (Step S65). Upon creating the R-block, the CPU 21 of the IC card 2 transmits the created R-block to the IC card processing device 1 by the communication section 25 (Step S66).

The control section 10 of the IC card processing device 1 receives the R-block from the IC card 2 by the card reader-writer 15. Upon receiving the R-block, the control section 10 of the IC card processing device 1 divide into a plurality of portions the data in the information field (INF) of the command data transmitted last (Step S67). Here, the control section 10 of the IC card processing device 1 divide into a plurality of portions the data in the information field (INF) of the command data transmitted at Step S62. A data size of each divided data portion is 256 bytes, for example, however, it is not limited to specific size. Moreover, divided data portion may be different in data size, respectively. Furthermore, the number into which the control section 10 divides the data is not limited to the specific number.

Upon dividing into a plurality of portions the data in the information field, the control section 10 gives an error detection code (EDC) to the divided data portion. Upon giving the error detection code to the divided data portion, the control section 10 creates a command data containing the divided data portion to which the error detection code was given in a predetermined format (for example, I-block) (Step S68). The error detection code is parity or the CRC, for example, however, it is not limited to specific contents.

Upon creating the command data, the control section 10 transmits the command data containing a top divided data portion (divided data 1) to the IC card 2 by the card reader-writer 15 (Step S69).

The CPU 21 of the IC card 2 receives the command data by the communication section 25. Upon receiving the command data from the IC card processing device 1, the CPU 21 of the IC card 2 performs the EDC inspection about the received command data (Step S32).

When an communication error is detected by the EDC inspection (Step S71, YES), the CPU 21 transmits an error notice showing that the IC card 2 failed in receiving the divided data portion to the IC card processing device 1 by the communication section 25 (Step S72). The CPU 21 may carry out amplitude modulation to the carrier wave, and may transmit the second carrier wave in an unmodulated period, for example, as the error notice.

When the CPU 21 transmits the error notice, the control section 10 of the IC card processing device 1 detects the error notice by the card reader-writer 15 (Step S73). Upon detecting the error notice, the control section 10 transmits again the command data transmitted last to the IC card 2 by the card reader-writer 15 (Step S74). Here, the control section 10 transmits the command data containing the divided data 1 to the IC card 2 by the card reader-writer 15.

The CPU 21 of the IC card 2 receives the command data by the communication section 25. Upon receiving the command data, the CPU 21 performs the EDC inspection about the received command data (Step S75).

Upon detecting the communication error by the EDC inspection (Step S76, YES), the CPU 21 returns to Step S72. When the communication error is not detected by the EDC inspection (Step S71, NO), or when the communication error is not detected by the EDC inspection (Step S76, NO), the CPU 21 stands by until the command data containing the next divided data portion is transmitted. Here, since the divided data 2 is a divided data portion next to the divided data 1, the CPU 21 stands by until the command data containing the divided data 2 is transmitted.

After a predetermined time (non-transmission period) passes after transmitting the response data containing the divided data 1 in Step S69 or Step S74, the control section 10 of the IC card processing device 1 transmits the command data containing the divided data 2 to the IC card 2 by the card reader-writer 15 (Step S77). Here, after passing at least a period of time when the second carrier wave can be modulated when the CPU 21 of the IC card 2 performs the EDC inspection and detects the error, the control section 10 transmits next command data.

Since operation after the CPU 21 of the IC card 2 receives the command data containing the divided data 2 is the same as the operation after receiving the command data containing the divided data 1, explanation thereof is omitted.

When the control section 10 of the IC card processing device 1 finishes transmitting all the command data, the control section 10 stands by. Upon receiving the EOF (End of Frame) that shows an end of the command data from the IC card processing device 1, the CPU 21 of the IC card 2 judge that all the command data were received. When the CPU 21 judged that all the command data were received, or when the communication error is not detected by the EDC inspection (Step S64, NO), the CPU 21 interprets the command from command data and executes the command. Upon executing the command, the CPU 21 transmits the response data including an executing result to the IC card processing device 1 by the communication section 25 (Step S79).

Figure 9:
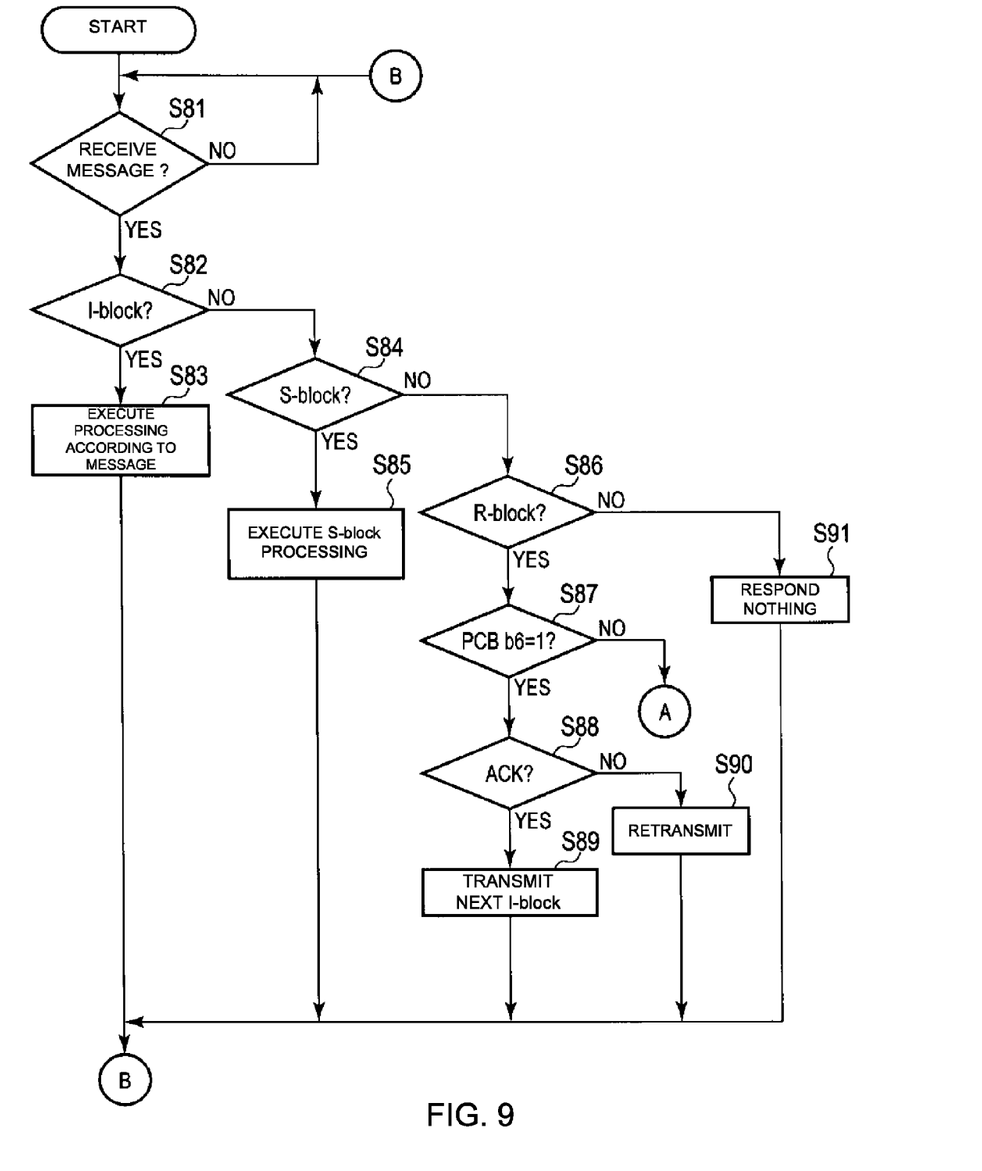
FIG. 9 is a flow chart for explaining an operation example of the IC card processing device concerning the second embodiment.
Figure 10:
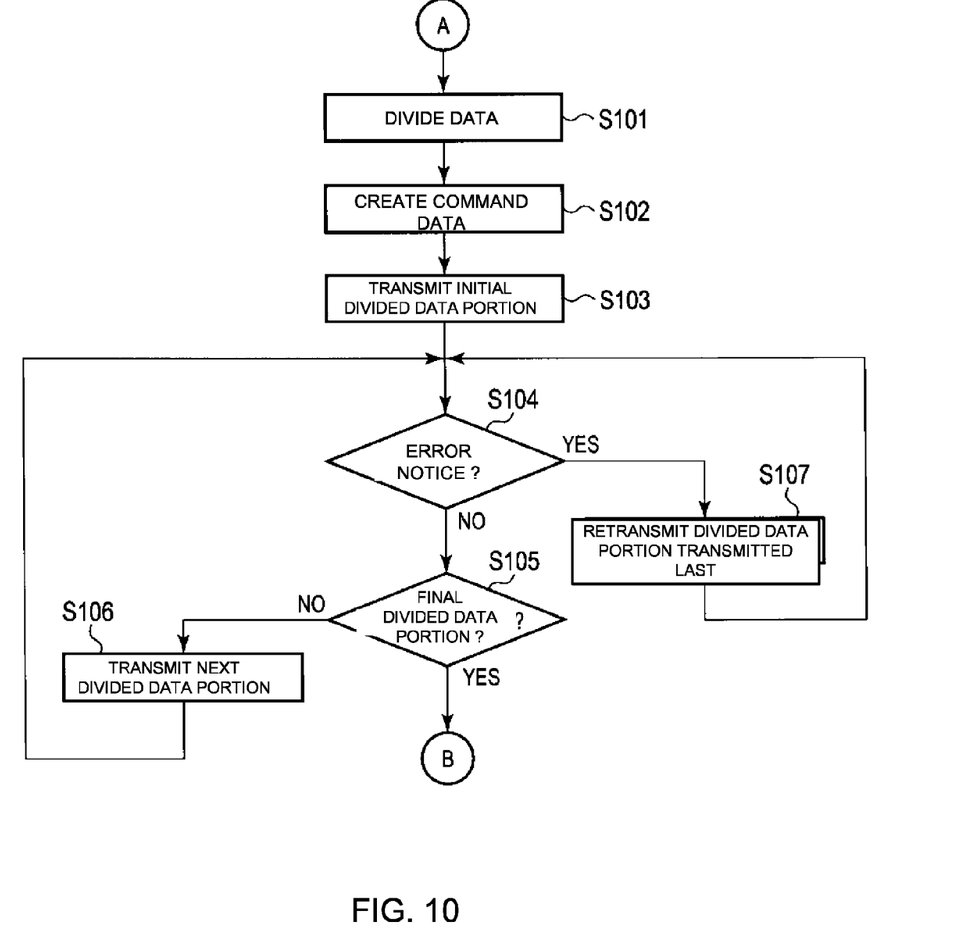
FIG. 10 is a flow chart for explaining an operation example of the IC card processing device concerning the embodiment 2.

Next, an operation example of the IC card processing device 1 that communicates with the IC card 2 is explained. FIGS. 9 and 10 are flow charts for explaining an operation example of the IC card processing device 1. The IC card processing device 1 transmits a carrier wave to the CPU 21, and starts the IC card 2. Moreover, the IC card processing device 1 receives the second carrier wave from the CPU 21, and becomes in a state that the IC card processing device 1 can receive the data from IC card 2. In addition, the IC card processing device 1 may transmit and receive the information about a communication protocol with the IC card 2. In this state, the control section 10 of the IC card processing device 1 transmits a message to the IC card 2 by the card reader-writer 15. After transmitting the message, the control section 10 of the IC card processing device 1 stands by until a message from the IC card 2 is received.

The control section 10 of the IC card processing device 1 judges whether the message was received from the IC card 2 by the card reader-writer 15 (Step S81). Upon judging that the message was not received (Step S81, NO), the control section 10 returns to Step S81.

Upon judging that the message was received (Step S81, YES), the control section 10 judges whether the received message is the I-block (Step S82). Upon judging that the received message is the I-block (Step S82, YES), the control section 10 acquires the response stored in the INF section of the I-block, and performs process according to the acquired response (Step S83).

Upon judging that the received message is not the I-block (Step S82, NO), the control section 10 judges whether the received message is the S-block (Step S84). Upon judging that the received message is the S-block (Step S84, YES), the control section 10 performs processing based on the received S-block (Step S85).

Upon judging that the received message is not the S-block (Step S84, NO), the control section 10 judges whether the received message is the R-block (Step S86). When the control section 10 judges that the received message is the R-block (Step S86, YES), the control section 10 judges whether b6 of the PCB of the received message is "1" (Step S87). That is, the control section 10 judges whether the received message requests dividing data and transmitting divided data or not.

Upon judging that b6 of the PCB of the received is "1" (Step S87, YES), the control section 10 judges whether the received message shows ACK (Step S88). That is, the control section 10 judges whether b5 of the PCB is "0."

Upon judging that the received message shows ACK (Step S88, YES), the control section 10 transmits next I-block to the IC card 2 (Step S89). In addition, when there is no next I-block, the control section 10 may skip Step S89.

Upon judging that the received message does not show ACK (that is, NAK is shown.) (Step S88, NO), the control section 10 retransmits the last message to the IC card 2 in a state as it is as NAK processing (Step S90). When the control section 10 judges that the received message is not the R-block (Step S86, NO), the control section 10 does not performs any response to the IC card 2 (Step S91). In addition, the control section 10 may perform an error processing etc. in Step S91.

When the control section 10 performs processing according to the acquired response (Step S83), when the control section 10 performs processing based on the received S-block (Step S85), when the control section 10 transmits the next I-block to the IC card 2 (Step S89), when the control section 10 retransmits the last message to the IC card 2 in the state as it is as the NAK processing (Step S90), or when the control section 10 does not perform any response to the IC card 2 (Step S91), the control section 10 returns to Step S81. In addition, in the above case, when the control section 10 does not need to receive a message from the IC card 2, the control section 10 may end the operation.

Upon judging that b6 of the PCB of the received message is not "1" (that is, it is "0".) (Step S87, NO), the control section 10 divides into a plurality of portions the data stored in the INF section of the command data transmitted last (Step S101). Upon dividing the data into a plurality of portions, the control section 10 gives the error detection code to the divided data portion and creates the command data which stores the divided data portion to which the error detection code is given (Step S102).

Upon creating the command data, the control section 10 transmits the command data containing the initial divided data portion to the IC card 2 (Step S103). Upon transmitting the command data containing the initial divided data portion to the IC card 2, the control section 10 judges whether the error notice was transmitted from the IC card 2 in a predetermined period (a non-transmission period, i.e., a non-modulation period) after the command data is transmitted (Step S104).

When the control section 10 judges that the error notice is not transmitted (Step S104, NO), the control section 10 judged whether the command data transmitted last is a command data containing the final divided data portion (Step S105). Upon judging that the command data transmitted last is not the command data containing the final divided data portion (Step S105, NO), that control section 10 transmits the command data containing next divided data portion to the IC card 2 (Step S106).

Upon judging that the error notice is transmitted (Step S104, YES), the control section 10 retransmits the command data transmitted last to the IC card 2 (Step S107).

When the control section 10 transmitted the command data containing the next divided data portion to the IC card 2 (Step S106), or when the control section 10 retransmitted the command data transmitted last to the IC card 2 (Step S107), the control section 10 returns to Step S104.

Upon judging that the command data transmitted last is the command data containing the final divided data portion (Step S105, YES), the Control section 10 returns to Step S81.

In the IC card and the IC card processing device configured as mentioned above, the IC card processing device should retransmit only the data which the error arose without a need to retransmit all the data even when the communication error arose when the IC card processing device transmits data with large data size to the IC card. Accordingly, the IC card processing device can transmit the data with large data size to the IC card efficiently.

While the embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such a form or modifications as would fall within the scope and spirit of the inventions.

What is claimed is:

1. A portable electronic device which executes a command from an external device, the portable electronic device comprising:
    a communication interface which transmits data and receives data with the external device; and
    a controller;
    wherein when the communication interface transmits data collectively to the external device and receives a divided-message retransmission request which requests to divide the data and to retransmit divided portions of the data from the external device,
    the controller
    divides the data into a plurality of divided portions of the data,
    gives an error detection code to each of the divided portions of the data,
    transmits each of the divided portions of the data to which the error detection code is given, to the external device by the communication interface so as to make a predetermined non-transmission period after transmission of each of the divided portions of the data, wherein the controller executes detecting an error notice showing a failure in receiving each of the divided portions of the data from the external device in the predetermined non-transmission period, and
    when the controller detects the error notice, the controller retransmits the divided portion of the data which the controller has transmitted just before the controller detects the error notice.

2. The portable electronic device according to the claim 1, wherein the controller detects that a carrier wave transmitted from the external device is modulated as the error notice.

3. An integrated circuit (IC) card processing device which transmits a command to an integrated circuit (IC) card, the IC card processing device comprising:
    a communications interface which transmits data and receives data with the IC card in a noncontact manner; and
    a controller;
    wherein, when the communication interface receives data collectively transmitted from the IC card and fails in receiving the data collectively transmitted from the IC card, the controller transmits a divided-message retransmission request which requests to divide the data and to retransmit divided portions of the data, to the IC card, receives each of the divided portions of the data to which an error detection code is given from the IC card through the communication interface:

judges whether the divided portion of the data is received without an error based on the error detection code given to the divided portion of the data received, and transmits an error notice showing a failure in receiving the divided portion of the data to the IC card through the communication interface when judging that the controller has failed in receiving the divided portion of the data, and receives the divided portion of the data which the controller has failed in receiving and which the IC card retransmits.

4. The IC card processing device according to the claim 3, wherein the controller modulates a carrier wave to transmit to the IC card as the error notice.

5. A portable electronic device which executes a command from an external device, the portable electronic device comprising:

a communication interface which transmits data and receives data with the external device in a noncontact manner, and a controller;

wherein, when the controller receives data collectively transmitted form the external device and fails in receiving the data collectively transmitted from the external device, the controller transmits a divided-message retransmission request which requests to divide the data and to retransmit divided portions of the data to the external device, receives each of the divided portions of the data to which an error detection code is given, from the external device through the communication interface, judges whether each of the divided portions of the data was received without an error based on the error detection code given to each of the divided portions of the data received, and transmits an error notice showing a failure in receiving the divided portion of the data to the external device when judging that the controller has failed in receiving the divided portion of the data, and receives the divided portion of the data which the external device retransmits.

6. The portable electronic device according to claim 5, wherein the controller modulates a carrier wave which is transmitted to the external device as the error notice.

7. The portable electronic device according to claim 5, wherein the controller transmits a second carrier wave to the external device as the error notice.

* * * * *